March 7, 1939.   H. M. DODGE   2,149,991
METHOD OF LINING HOLLOW ARTICLES WITH RUBBER
Filed March 25, 1936
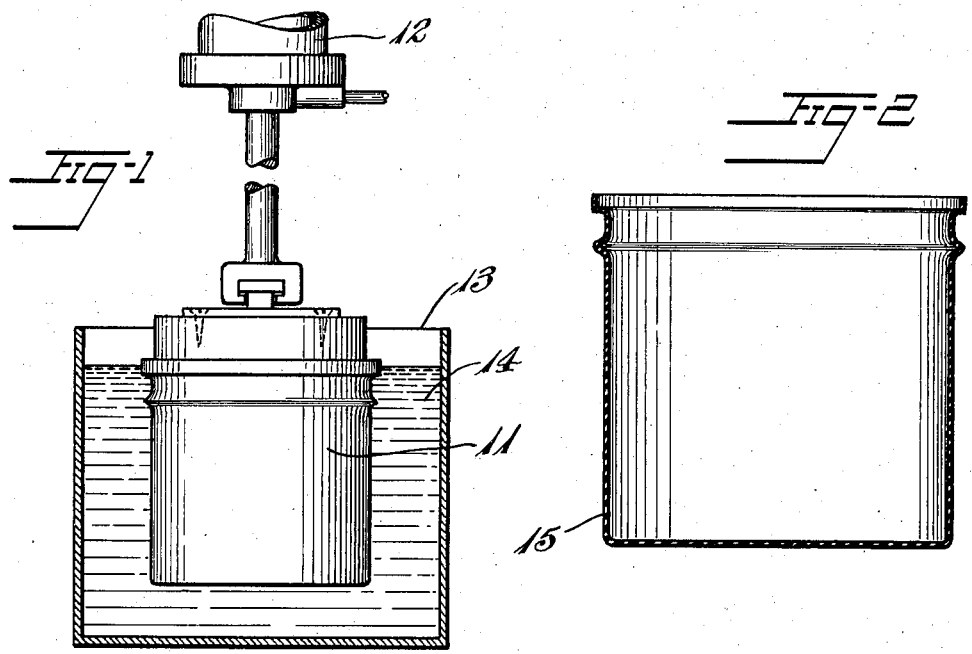
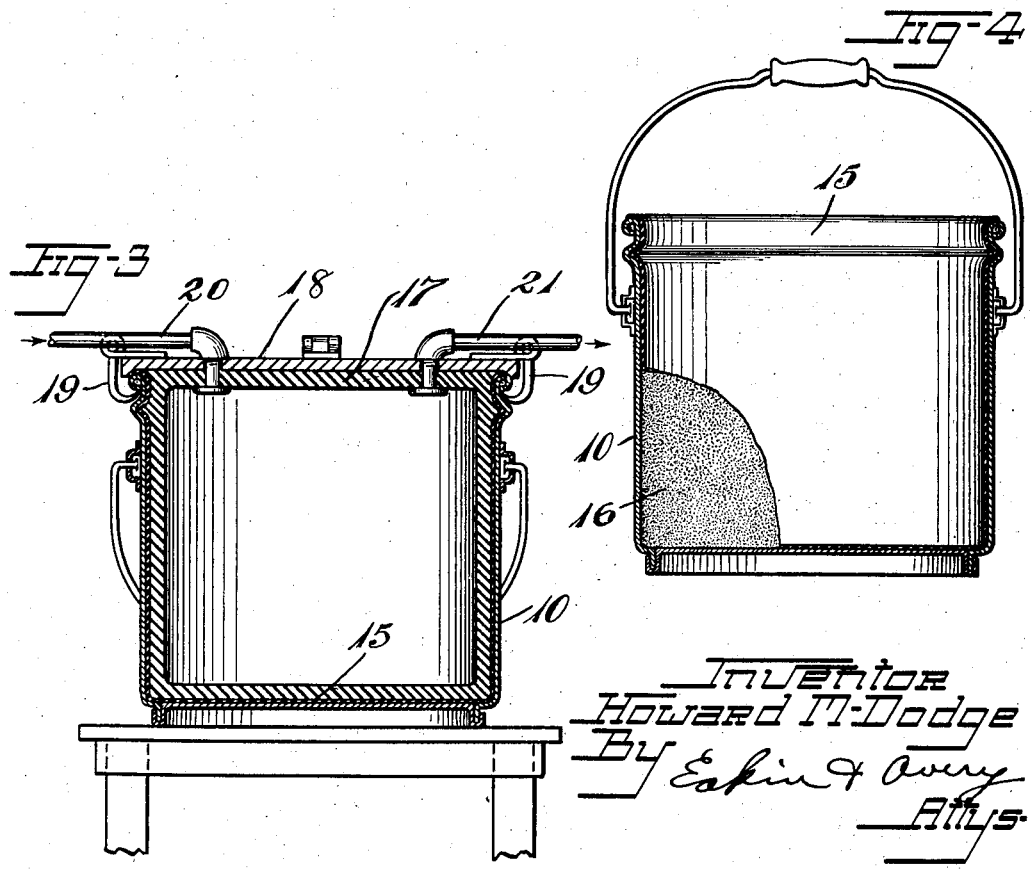
Inventor
Howard M. Dodge
By Eakin & Avery
Attys.

Patented Mar. 7, 1939

2,149,991

UNITED STATES PATENT OFFICE 2,149,991

METHOD OF LINING HOLLOW ARTICLES WITH RUBBER

Howard M. Dodge, Akron, Ohio, assignor to The B. F. Goodrich Company, New York, N. Y., a corporation of New York Application March 25, 1936, Serial No. 70,822

4 Claims. (Cl. 18—59)

This invention relates to methods of lining hollow articles with rubber and is especially useful in the manufacture of metal rubber-lined battery jars, acid containers, and the like.

The principal objects of the invention are to provide a one piece lining and to accomplish the placing of such a lining within a hollow rigid article with simplicity, economy and efficiency.

Other objects will appear from the following description and the accompanying drawing.

Of the drawing:

Fig. 1 is an elevation of a dipping form suspended by an air hoist in a tank containing a dispersion of rubber, and illustrating the forming of the one-piece lining, the tank being shown in section and the air hoist being partly broken away.

Fig. 2 is a sectional elevation of the rubber lining.

Fig. 3 is a sectional elevation of the preferred form of apparatus for pressing and vulcanizing the lining in a hollow article, the apparatus being shown in operative position within the hollow article and its rubber lining.

Fig. 4 is a sectional view of the lined hollow article, part of the lining being broken away for clearness.

Referring to the drawing, the numeral 10 designates a rigid hollow article, a pail being shown, which is to be lined with a seamless rubber lining. A dipping form 11 is prepared of such dimensions that when covered with the desired thickness of rubber the outside dimensions of the deposited rubber will be substantially the same as the internal dimensions of the hollow article so that the lining can be inserted in the article and pressed into adhesion therewith without objectionable stretching of the lining, such as might weaken the adhesion or render the rubber vulnerable to abrasion, and without objectionable wrinkling of the lining such as would occur if it were excessively oversize. The form 11 is made of such depth however that the deposited rubber lining will extend above the hollow article to permit its being turned back over the margin of the open end of the article.

By means of an air hoist 12, or other suitable lifting means, the form is lowered into a receptacle 13 containing a liquid dispersion 14 of rubber.

Rubber is deposited upon the form until a lining 15 of the desired thickness is formed. Preferably, the depositing of the rubber is accomplished by the well known coagulant dip method from an aqueous dispersion of rubber but it may also be accomplished by electro deposit from an aqueous dispersion or by deposit from a dispersion of rubber in a solvent.

If desired, the rubber coating may be fully or partially vulcanized while it is on the form but I prefer to simply dry the deposit and dust it with zinc stearate, stearic acid, or other material to permit handling. The rubber lining is stripped from the form and appears as shown in Fig. 2. Further operations may be carried out at the factory where the lining is formed, or the lining either vulcanized or unvulcanized may be shipped to the place where the hollow articles are manufactured, as the installation of the unitary lining requires only simple apparatus.

When the linings are to be installed in the articles, the articles are cleaned and given a coat 16 of adhesive material, preferably a cement containing a polymer of rubber, the lining is placed in the article in contact with the cement and forced in place by differential pressure applied to the article. A convenient method is to provide an expansible bag 17 of vulcanized rubber having the same shape and dimensions as the inside of the lining. The bag is preferably mounted upon a rigid cover plate 18 provided with swing clamps 19 for retaining the cover on the hollow article. Pipes 20, 21 connect the interior of the expansible bag with a source of fluid pressure, preferably hot water or steam, whereby the bag may be expanded and at the same time provide a source of heat for vulcanizing the lining in place.

In order to facilitate the placing of the lining in the hollow article despite its close fit, the cement coating 16 may be dusted with stearic acid and a similar dusting applied to the lining. This layer of dust lubricates the surfaces to permit their sliding upon each other and also permits entrapped air to escape. When heat is applied, to vulcanize the lining and/or the cement, the stearic acid melts and is absorbed by the rubber.

I claim:

1. The method of lining hollow articles which comprises forming substantially to final form a rubber lining, cementing the interior of the hollow article, applying to one of the contacting surfaces a lubricating material adapted to be absorbed by the rubber during vulcanization, inserting the lining in the article, and pressing the lining into intimate contact with the cemented surface of the article.

2. The method of lining hollow articles which comprises forming substantially to final form a rubber lining, applying an adhesive to one of the surfaces of the lining and article, applying to one of said surfaces a lubricating material adapted to be absorbed by the rubber during vulcanization, inserting the lining in the article with said surfaces adjacent, and expanding the lining against the article to adhere the same thereto.

3. The method of lining hollow articles with rubber which comprises forming substantially to final form a one-piece seamless rubber lining, cementing the interior of the hollow article, dusting the cemented surface with a dust adapted to be absorbed by the rubber, inserting the lining in the article, and pressing the lining into intimate contact with the surface of the article.

4. The method of lining hollow articles with rubber which comprises forming substantially to final form a one piece seamless rubber lining, cementing the interior of the hollow article, dusting the cemented surface with a dust adapted to be absorbed by the rubber, inserting the lining in the article, pressing the lining into intimate contact with the surface of the article, and applying heat to vulcanize the lining in place.

HOWARD M. DODGE.